United States Patent
Lai et al.

[11] Patent Number: 6,165,255
[45] Date of Patent: Dec. 26, 2000

[54] CHEMICAL-LIQUID CONTROLLING APPARATUS

[75] Inventors: Chien-Hsin Lai, Kaohsiung Hsien; Peng-Yih Peng; Li-Min Chang, both of Hsinchu Hsien; Fu-Yang Yu, Hsinchu, all of Taiwan

[73] Assignee: United Microelectronics Corp., Taiwan

[21] Appl. No.: 09/267,845

[22] Filed: Mar. 12, 1999

[51] Int. Cl.[7] .................................................. B01D 19/00
[52] U.S. Cl. ........................ 96/156; 96/179; 96/180; 96/197; 96/220
[58] Field of Search ..................... 96/155, 156, 157, 96/197, 179, 180, 206, 220; 95/241, 254, 262; 55/339, 340

[56] References Cited

U.S. PATENT DOCUMENTS

| | | | |
|---|---|---|---|
| 2,815,765 | 12/1957 | Adelson | 96/197 |
| 3,116,999 | 1/1964 | Armbruster | 96/197 |
| 3,981,335 | 9/1976 | Deters | 96/156 |
| 4,074,734 | 2/1978 | De Beau et al. | 96/220 |
| 4,355,652 | 10/1982 | Perkins | 95/241 |
| 4,955,992 | 9/1990 | Goodale et al. | 96/197 |
| 4,997,464 | 3/1991 | Kopf | 96/197 |

FOREIGN PATENT DOCUMENTS

| 1321687 | 7/1987 | U.S.S.R. | 96/197 |
|---|---|---|---|

*Primary Examiner*—Duane S. Smith
*Attorney, Agent, or Firm*—Martine, Penilla & Kim, LLP

[57] ABSTRACT

A chemical-liquid controlling apparatus is described. The chemical-liquid controlling apparatus is mounted between a chemical-liquid container and an exhaust apparatus. During a chemical-liquid refilling process, once the chemical liquid is drawn out of the container by the exhaust apparatus, the chemical liquid first enters the chemical-liquid controlling apparatus. The chemical-liquid controlling apparatus separates the chemical liquid from a nitrogen gas and a chemical gas. In addition, the chemical-liquid refilling process is stopped by a signal transmitted from a leak sensor.

10 Claims, 1 Drawing Sheet

CHEMICAL-LIQUID CONTROLLING APPARATUS

BACKGROUND OF THE INVENTION

1. Field of the Invention

The present invention relates to a safety apparatus in industry. More particularly, the present invention relates to a chemical-liquid controlling apparatus.

2. Description of the Related Art

A variety of chemical liquids are used in industry in order to meet different industrial requirements. In order to facilitate different process and different equipment in the factories, various types of automatic chemical-liquid supplying apparatus are produced accordingly to meet demands for low cost and high productivity.

In industry, a common chemical-liquid supplying apparatus includes a container used to contain chemical liquids, a chemical-liquid inlet pipe, and a chemical-liquid outlet pipe. Moreover, in order to prevent the chemical liquid of the container from pollution by air moisture and impurities, a nitrogen gas is supplied to flow through above the chemical liquid in the container, while an exhaust apparatus is operated. The nitrogen gas and the chemical gas volatilized from the chemical liquid are exhausted through an exhaust pipe to flow away from the container. In addition, a high-level sensor and a low-level sensor are mounted at different heights in the container, so as to sense the liquid level and transmit signals. In this manner, a chemical-liquid refilling process can automatically resupply chemical liquid into the container.

While the chemical liquid is used, the chemical liquid is supplied though the chemical-liquid inlet pipe. Once the liquid level decreases to a low level, the low-level sensor transmits a signal, so as to refill automatically the chemical liquid. When the refilling chemical liquid reaches a high level, the high-level sensor transmits a controlling signal to stop the chemical-liquid refilling process.

However, since the chemical liquid is caustic, the chemical liquid easily causes malfunctions in the sensors. In particular, when the malfunctions occur in the sensor because of erosion by chemical liquids, the refilling chemical liquid may easily raise above the high level without being noticed. Once the refilling chemical liquid reaches a level that is closer to the exhaust pipe, the exhaust pipe easily draws out the chemical liquid. Therefore, malfunctions readily occur in the exhaust apparatus and the exhaust pipe and workers may also be injured.

SUMMARY OF THE INVENTION

The invention provides a chemical-liquid controlling apparatus, which is mounted between a chemical-liquid supplying apparatus and an exhaust apparatus to provide a passage for an exhaust stream flowing from the chemical-liquid supplying apparatus to the exhaust apparatus. A first chemical-liquid pipe is connected to a bottom of a liquid-gas separator. A second chemical-liquid pipe is connected to the bottom of the liquid-gas separator. The first chemical-liquid pipe is closer to the chemical-liquid supplying apparatus than the second chemical-liquid pipe is. A barrier structure is placed in the liquid-gas separator in such a way that it separates the first and second chemical-liquid pipe and partially blocks a space in the liquid-gas separator, so that liquid content in the exhaust stream is substantially collected in the liquid-gas separator and gas or vapor content in the exhaust stream passes the passage to the exhaust apparatus. A leak sensor is mounted on the first chemical-liquid pipe.

In the invention, the chemical-liquid controlling apparatus is mounted between the chemical-liquid container and the exhaust apparatus. During a chemical-liquid refilling process, once the exhaust apparatus accidentally draws the chemical liquid from the container, the chemical-liquid controlling apparatus can solve the problem. The chemical-liquid controlling apparatus separates the chemical liquid from a nitrogen gas and a chemical gas, in order to prevent the occurrence of malfunctions. In addition, the leak sensor transmits a signal to stop the chemical-liquid refilling process, so as to prevent a dangerous situation from occurring.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
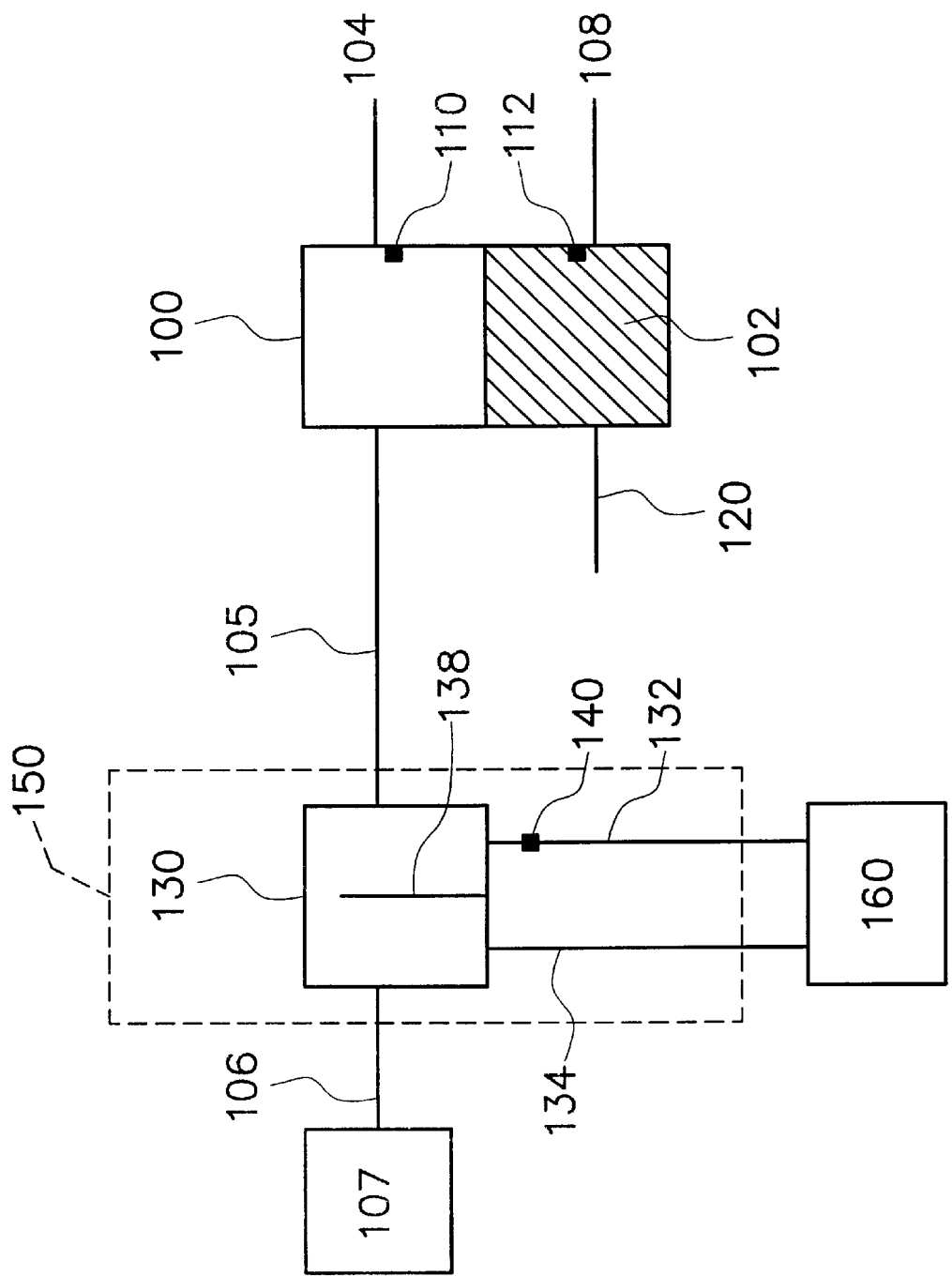
FIG. 1 is a schematic, cross-sectional view showing a chemical-liquid controlling apparatus between a chemical-liquid supplying apparatus and a exhaust apparatus according to one preferred embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In FIG. 1, a chemical-liquid supplying apparatus includes a container 100 used for containing chemical liquid 102. A chemical-liquid inlet pipe 120 and a chemical-liquid outlet pipe 108 are connected to the lower portion of the container 100. A low-level sensor 112 is mounted in the container 100 at a certain low level. A high-level sensor 110 is mounted in the container 100 at a certain high height. A nitrogen-supplying pipe 104 is connected to the upper portion of the container 100. One end of an exhaust pipe 105 is connected to the upper portion of the container 100. The other end of the exhaust pipe 105 is connected to a liquid-gas separator 130. One end of an exhaust pipe 106 is connected to the liquid-gas separator 130. The connection between the exhaust pipe 106 and the liquid-gas separator 130 preferably is far away from the connection between the exhaust pipe 105 and the liquid-gas separator 130. The other end of the exhaust pipe 106 is connected to an exhaust apparatus 107. The exhaust apparatus 107 is used to draw an exhaust stream from the container 100 through the exhaust pipe 105, the chemical-liquid controlling apparatus (described below), and the exhaust pipe 106. The bottom of the liquid-gas separator 130 is connected to several chemical-liquid pipes. The preferred embodiment takes chemical-liquid pipes 132 and 134 as an example, but any other amount of the chemical-liquid pipes may be used. A barrier structure, such as a plate 138 in this preferred embodiment, is placed in the liquid-gas separator 130 between the openings of the chemical-liquid pipes 132 and 134. The plate 138 partially blocks a space in the liquid-gas separator 130. The plate 138 placed in the liquid-gas separator in such a way that it separates the chemical-liquid pipes 132 and 134 and partially blocks the space in the liquid-gas separator 130, so that liquid content in the exhaust stream is substantially collected in the liquid-gas separator 130 and gas or vapor content in the exhaust stream passes the passage to the exhaust apparatus 107. A leak sensor 140 is mounted on the chemical-liquid pipe 132. The leak sensor 140 can be any other suitable conventional sensor, for example. A liquid-gas controlling apparatus 150 of the present invention includes the liquid-gas separator 130, the barrier structure, such as the plate 138, the chemical-liquid pipes 132 and 134, and the leak sensor 140.

The container 100 is used for containing the chemical liquid 102. In order to prevent the chemical liquid 102 in the container 100 from being polluted by air moisture or impurities, a nitrogen gas is supplied above the chemical liquid 102 contained in the container 100 through the nitrogen-supplying pipe 104. In addition, the nitrogen gas and the chemical gas volatilized from the chemical liquid 102 are exhausted through an exhaust pipe 105 from the container 100.

While using the chemical liquid 102, the chemical liquid 102 is supplied to the platform through the chemical-liquid outlet pipe 108. During the chemical liquid 102 supplying process, the amount of chemical liquid 102 in the container 100 is decreased and the height of the chemical liquid 102 in the container 100 is lowered gradually. When the chemical liquid 102 surface decreased to a certain low level, the low-level sensor 112 transmits a signal. The chemical liquid 102 starts to be supplied into the container 100 through the chemical-liquid inlet pipe 120. Once the chemical-liquid 102 reaches a high level, the high-level sensor 110 transmits a signal to stop the refilling process of the chemical liquid 102.

However, since the chemical liquid 102, such as acid, probably is caustic, the chemical liquid 102 easily causes malfunctions in the sensors 110 and 112. In particular, once a malfunction occurs in the high-level sensor 110 because of the erosion by chemical liquid 102, the chemical liquid 102 easily rises above the high level during the chemical-liquid refilling process. Once the chemical liquid 102 reaches a level that is closer to the exhaust pipe, the exhaust pipe 105 easily draws the chemical liquid 102 into the liquid-gas separator 130. Thus, the exhaust apparatus 107 may further draw in the chemical liquid 102. Therefore, malfunctions occur in the exhaust apparatus 107 and the exhaust pipe 105 and workers may also be injured.

The invention solves the above-described problems by assembling the liquid-gas controlling apparatus 150 between the container 100 and the exhaust apparatus 107 to provide a passage for the exhaust stream flowing from the chemical-liquid supplying apparatus to the exhaust apparatus 107. If the exhaust apparatus 107 draws in the exhaust stream including the chemical liquid 102 from the container 100, the chemical liquid 102 enters the chemical-liquid controlling apparatus 150 through the exhaust pipe 105. Because the chemical liquid 102 has a density greatly higher than the densities of chemical gas and the nitrogen gas, the plate 138 easily blocks and collects the chemical liquid 102. The blocked chemical liquid 102 thus flows into the chemical-liquid pipe 132. Once the leak sensor 140 on the chemical-liquid pipe 132 senses the chemical liquid 102, the leak sensor 140 transmits the signal to stop the chemical-liquid refilling process. Preferably, a chemical-liquid recycling apparatus 160 is connected to the chemical-liquid pipes 132 and 134. Thus, the chemical liquid 102 flowing into the liquid-gas separator 130 can be recycled through the chemical-liquid pipes 132 and 134.

As seen in the above description, the chemical-liquid controlling apparatus 150 prevents the chemical liquid 102 from being drawn into the exhaust apparatus 107. In addition, the present invention is not limited to two chemical-liquid pipes 132 and 134 and one plate 138. If desired, the design of the liquid-gas controlling apparatus 150 can be altered according to specific requirements. For example, when a huge amount of the chemical liquid 102 is drawn away from the container 100, the bottom of the liquid-gas separator 130 can be connected to more chemical-liquid pipes and mounted with more plates. In this manner, even if a huge amount of chemical liquid 102 is drawn out from the container 100, the plates in the liquid-gas separator 130 can also effectively separate the chemical liquid 102 from the nitrogen gas and the chemical gas. In addition, the leak sensor 140 is mounted on a chemical-liquid pipe, which is closest to the chemical-liquid supplying apparatus.

In the invention, a chemical-liquid controlling apparatus is mounted between a chemical-liquid container and an exhaust apparatus to provide a passage for an exhaust stream flowing from a chemical-liquid supplying apparatus to an exhaust apparatus. During a chemical-liquid refilling process, once the chemical liquid is accidentally drawn out of the container by the exhaust apparatus, the chemical liquid first enters the chemical-liquid controlling apparatus. The chemical-liquid controlling apparatus separates liquid content, such as the chemical liquid, in the exhaust stream from gas or vapor content, such as a nitrogen gas and a chemical gas, in the exhaust stream. In addition, the chemical-liquid refilling process is stopped by a signal transmitted from a leak sensor. Thus malfunctions do not occur in the exhaust apparatus.

It will be apparent to those skilled in the art that various modifications and variations can be made to the structure and the method of the present invention without departing from the scope or spirit of the invention. In view of the foregoing, it is intended that the present invention cover modifications and variations of this invention provided they fall within the scope of the following claims and their equivalents.

What is claimed is:

1. A chemical-liquid controlling apparatus, which is mounted between a chemical-liquid supplying apparatus and an exhaust apparatus to provide a passage for an exhaust stream flowing from the chemical-liquid supplying apparatus to the exhaust apparatus, comprising:

a liquid-gas separator having a bottom with first and second openings formed therein;

a first chemical-liquid pipe having an end connected to the first opening in the bottom of the liquid-gas separator;

a second chemical-liquid pipe having an end connected to the second opening in the bottom of the liquid-gas separator, wherein the first chemical-liquid pipe is closer to the chemical-liquid supplying apparatus than the second chemical-liquid pipe;

a barrier structure disposed in the liquid-gas separator between the first and second openings in the bottom of the liquid-gas separator, the barrier structure being configured to intercept the flow of the exhaust stream and to define a passage through the liquid-gas separator so that liquid content in the exhaust stream is substantially collected in the liquid-gas separator and gas or vapor content in the exhaust stream flows through the passage to the exhaust apparatus; and a leak sensor for sensing the presence of a chemical liquid mounted on the first chemical-liquid pipe.

2. The apparatus of claim 1, wherein the barrier structure comprises a plate that is disposed substantially perpendicularly to the bottom of the liquid-gas separator.

3. The apparatus of claim 1, wherein opposite ends of the first chemical-liquid pipe and the second chemical-liquid pipe are connected to a chemical-liquid recycling apparatus.

4. A chemical-liquid controlling apparatus, which is mounted between a chemical-liquid supplying apparatus and an exhaust apparatus, comprising:

a liquid-gas separator;

a plurality of chemical-liquid pipes connected to a bottom of the liquid-gas separator;

a plurality of barrier structures placed in the liquid-gas separator in such a way that the barrier structures separate the chemical-liquid pipes and partially block a space in the liquid-gas separator, so that liquid content in an exhaust stream flowing into the liquid-gas separator is substantially collected in the liquid-gas separator and gas or vapor content in the exhaust stream flows through a passage defined in the liquid-gas separator and into the exhaust apparatus; and a leak sensor for sensing the presence of a chemical liquid mounted on one of the chemical-liquid pipes, wherein the chemical-liquid pipe on which the leak sensor is mounted is the one that is closest to the chemical-liquid supplying apparatus.

5. The apparatus of claim 4, wherein the barrier structures comprise plates that are disposed substantially perpendicularly to the bottom of the liquid-gas separator.

6. The apparatus of claim 4, wherein opposite ends of the plurality of chemical-liquid pipes are connected to a chemical-liquid recycling apparatus.

7. A chemical-liquid supplying apparatus comprising:

a container for containing a chemical liquid, the container being connected to an inert gas-supplying pipe;

a first exhaust pipe having a first end that is connected to the container;

a chemical-liquid controlling apparatus connected to the second end of the first exhaust pipe, the chemical-liquid controlling apparatus including a leak sensor for sensing the presence of a chemical liquid;

a second exhaust pipe having a first end connected to the chemical-liquid controlling apparatus; and an exhaust apparatus connected to the second end of the second exhaust pipe.

8. The apparatus of claim 7, wherein the chemical-liquid controlling apparatus comprises:

a liquid-gas separator having a bottom with first and second openings formed therein;

a first chemical-liquid pipe having an end connected to the first opening in the bottom of the liquid-gas separator;

a second chemical-liquid pipe having an end connected to the second opening in the bottom of the liquid-gas separator, wherein the first chemical-liquid pipe is closer to the chemical-liquid supplying apparatus than the second chemical-liquid pipe;

a barrier structure disposed in the liquid-gas separator between the first and second openings in the bottom of the liquid-gas separator, the barrier structure being configured to intercept the flow of the exhaust stream and to define a passage through the liquid-gas separator so that liquid content in the exhaust stream is substantially collected in the liquid-gas separator and gas or vapor content in the exhaust stream flows through the passage to the exhaust apparatus; and wherein the leak sensor is mounted on the first chemical-liquid pipe.

9. The apparatus of claim 8, wherein the barrier structure comprises a plate that is disposed substantially perpendicularly to the bottom of the liquid-gas separator.

10. The apparatus of claim 8, wherein opposite ends of the first chemical-liquid pipe and the second chemical-liquid pipe are connected to a chemical-liquid recycling apparatus.

* * * * *